(12) United States Patent
Yoo

(10) Patent No.: US 12,086,639 B2
(45) Date of Patent: Sep. 10, 2024

(54) SERVER MANAGEMENT SYSTEM CAPABLE OF SUPPORTING MULTIPLE VENDORS

(71) Applicant: GeniAI CO.,LTD, Seoul (KR)

(72) Inventor: Se Kweon Yoo, Seoul (KR)

(73) Assignee: GeniAI CO.,LTD, Seoul (KR)

( * ) Notice: Subject to any disclaimer, the term of this patent is extended or adjusted under 35 U.S.C. 154(b) by 0 days.

(21) Appl. No.: 18/373,010

(22) Filed: Sep. 26, 2023

(65) Prior Publication Data

US 2024/0111584 A1    Apr. 4, 2024

(30) Foreign Application Priority Data

Sep. 29, 2022    (KR) .................. 10-2022-0124122

(51) Int. Cl.
*G06F 9/50*    (2006.01)
*G06Q 10/0631*    (2023.01)

(52) U.S. Cl.
CPC ....... *G06F 9/5027* (2013.01); *G06Q 10/0631* (2013.01)

(58) Field of Classification Search
CPC .................................................. G06F 9/5027
See application file for complete search history.

(56) References Cited

U.S. PATENT DOCUMENTS

| | | | | |
|---|---|---|---|---|
| 10,445,311 | B1 * | 10/2019 | Saurabh | ............. H04L 63/1425 |
| 2017/0004015 | A1 * | 1/2017 | Raja | ...................... G06F 9/5083 |

(Continued)

FOREIGN PATENT DOCUMENTS

| | | |
|---|---|---|
| KR | 10-2015-0124642 A | 11/2015 |
| KR | 10-1867813 B1 | 6/2018 |

(Continued)

OTHER PUBLICATIONS

Notice of Allowance from corresponding Korean Patent Application No. 10-2022-0124122, dated Feb. 2, 2023.

(Continued)

*Primary Examiner* — Kristie D Shingles
(74) *Attorney, Agent, or Firm* — Harness, Dickey & Pierce, P.L.C.

(57) ABSTRACT

Disclosed is an extended high-performance server integrated management system based on remote server management standard to efficiently manage existing high-performance servers and ultra-high-performance servers capable of supporting extended BMC functions. This system includes multiple modules responsible for each major function, considering a possibility of large-scale expansion, and each module can be run on an independent server depending on the size of the management system. In addition, this system utilizes the Intelligent Platform Management Interface (IPMI) standard, which is widely used for efficient remote hardware management of ultra-high-performance servers, and supports function for collecting hardware monitoring information linked to BMC for various functions such as temperature, power, and fan speed and collectively controlling the hardware on the basis of the collected data. In this case, an out-of-band based agent communication method was used to extend the BMC functionality. In addition, it also supports group management of each server, boot option change, Serial Over Lan (SOL)-based remote console access function, and the function of delivering event-specific warnings and alarms based on collected hardware monitoring information. Furthermore, the collected hardware status information of each server is continuously stored in the database and managed to be used as basic data for future failure prediction and prevention.

1 Claim, 23 Drawing Sheets

(56) References Cited

U.S. PATENT DOCUMENTS

| | | | | |
|---|---|---|---|---|
| 2018/0102953 | A1* | 4/2018 | Mahindru | G06F 9/5094 |
| 2019/0138638 | A1* | 5/2019 | Pal | G06F 16/285 |
| 2020/0057618 | A1* | 2/2020 | Alex | G06F 8/433 |
| 2020/0310852 | A1* | 10/2020 | Featonby | G06F 9/45558 |
| 2022/0019474 | A1* | 1/2022 | Kumar | G06F 9/5061 |
| 2022/0108262 | A1* | 4/2022 | Cella | G06Q 10/063118 |

FOREIGN PATENT DOCUMENTS

| | | |
|---|---|---|
| KR | 10-2139058 B1 | 7/2020 |
| KR | 10-2188987 B1 | 12/2020 |

OTHER PUBLICATIONS

Office Action from corresponding Korean Patent Application No. 10-2022-0124122, dated Nov. 10, 2022.

"Multi-vendor server support" Intel launches proprietary server KVM tool, https://www.ciokorea.com/print/19933, Feb. 17, 2014.

Extended high-performance server integrated management system based on remote server management standard, Seung-Woo Noh, Jin-Seung Yoo, Chan-Yeol Park, 2020 Korea Communications Society, Summer Conference.

* cited by examiner

| No | Classifications | Description |
|---|---|---|
| 1 | Same chassis classification | Product size (1U, 2U, 3U, 4U), Product name (R650, R740, DSS8440, R440 2J) |
| 2 | Same CPU classification | Intel CPU, AMD CPU classification -> Check and classify (Intel 6248R - check/classify whether or not they have the same specifications) CPU model |
| 3 | Same memory device classification | Classify memory manufacturer (Samsung, SK-hynix, Micron) -> Check whether they have same memory capacity Check production date (week) -> If they have same memory capacity and same production date, classify them as the same group |
| 4 | Same NIC device classification | Check NIC manufacturer (Intel, Broadcom, Mellanox, etc) -> If they are manufactured from same manufacturer, check/classify their capacity (1Gb, 10Gb, 25Gb, 40Gb, etc). -> Check/classify serial numbers and production dates |
| 5 | Same disk device classification | Disk type (NVMe, SSD, HDD), manufacturer (Samsung, KIOXIA, WD, SK-hynix, Micron, Intel, etc) |
| 6 | Same HBA device classification | Classify HBA manufacturers (brocade, Qlogic), Classify Product (8Gb FC, 16 Gb FC), Classify production date (whether they have same production date/week) |
| 7 | Same BIOS device classification | Classify BIOS product type -> (PERC H740P LP (Low Profile)/FH(Full Height), PERC HBA330+, PERC H730P LP (Low Profile)/ FH (Full Height) |
| 8 | Same driver version device classification | Classify devices depending on driver versions installed in each server |
| 9 | Same OS device classification | Classify devices depending on OS type ((windows, ubuntu, redhat, suse, etc) |
| 10 | Same FW version device classification | Classify devices depending on FW versions installed in each server |

FIG. 19

| Index | SYMPTOM (PROBLEM) | CAUSE (ANALYSIS) |
|---|---|---|
| 1 | RAC1198 | iDRAC Firmware issue |
| 2 | Correctable memory failure | memory issue or BIOS firmware issue |
| 3 | Link Failure | NIC failure or firmware issue |
| 4 | Repetitive Link Failure Count | NIC driver or firmware issue |
| 5 | NIC Link is Down | NIC driver or firmware issue |
| 6 | NIC driver or firmware issue | NIC driver or firmware issue |
| 7 | HOST_DOWN | NIC driver or firmware issue |
| 8 | Yellow light flickering on server front side | iDRACk firmware issue |
| 9 | SWC5008:critical message | iDRACk firmware issue |
| 10 | NO_PARTITION alarm | Disk failure |
| 11 | Reset adapte | BIOS firmware issue |
| 12 | Correctable memory error | memory issue or BIOS firmware issue |
| 13 | CPU performance down | BIOS firmware issue |
| 14 | No indication for memory and slot | memory issue or BIOS firmware issue |
| 15 | Disk fault error | Disk failure |
| 16 | disk_predicted fail | failure by disk bad block |
| 17 | Periodic FAN6 recognition failure | FAN6 failure |
| 18 | Fault by low light intensity of 400 or lower | Gbic failure |
| 19 | NIC GBIC communication impossible | Gbic failure |
| 20 | Endless system boot | BIOS firmware issue |
| 21 | Specific message on LCD panel | iDRAC firmware issue |
| 22 | Repeated error message in iDRAC | iDRAC firmware issue |
| 23 | vCenter agent synchronization failure | EXSi version or OS version issue |
| 24 | Server reboot problem | BIOS firmware issue |
| 25 | HBA write speed down | HBA firmware or driver issue |
| 26 | HBA Read speed down | HBA firmware or driver issue |
| 27 | HBA Link Down | HBA Gbic or card issue |
| 28 | HBA duplication switching failure | HBA Gbic or card issue |
| 29 | Riser1 recognition failure | Riser Card issue |
| 30 | Riser2 recognition failure | Riser Card issue |
| 31 | Network duplication failure | network card issue |
| 32 | PSU Alert yellow LED light flickering | PSU failure |
| 33 | Abnormality by low voltage | PSU failure |
| 34 | PXE boot impossible | BIOS setting or NIC firmware/driver issue |
| 35 | POST boot impossible | mainboard failure |
| 36 | LifeCycle access denied | mainboard failure |
| 37 | iDRAC Hang | iDRAC firmware issue |
| 38 | iDRAC Network disconnection | mainboard failure or iDRAC firmware issue |
| 39 | iDRAC SNMP service failure | iDRAC firmware issue |
| 40 | Abrupt server shutdown | mainboard issue |
| 41 | Medium failure | disk failure |
| 42 | Request to check failure event | issue by failure event |
| 43 | CMC access denied | CMC firmware issue |

FIG. 20

| 44 | DSET analysis request | failure caused by analysis |
|---|---|---|
| 45 | TSR Log analysis request | failure caused by analysis |
| 46 | NFS service start failure | NFS setting or OS setting error |
| 47 | vCenter access denied | EXSi version or OS version issue |
| 48 | NIC Reset | network card issue |
| 49 | GPU recognition failure | GPU card failure |
| 50 | OS crash | OS Dump analysis |
| 51 | Network failure/dropped packets | network card issue |
| 52 | CRC error | network card issue |
| 53 | Server-switch disconnection | network card issue |
| 54 | Uneasy communication to network (bonding) | network card issue |
| 55 | Uneasy communication to network (bonding) | memory failure or mainboard failure |
| 56 | Access denied in Disk Read Only state | disk failure or RAID configuration issue |
| 57 | Switch hanging three or four times per month | mainboard or OS version issue |
| 58 | LACP network speed problem | network card issue |
| 59 | Cluster fail-over | cluster setting issue or hardware failure |
| 60 | RTSP synchronization failure | OS setting or network failure |
| 61 | Session down | network card or Gbic issue |
| 62 | Unknown Power Off | PSU failure |
| 63 | Server slowness and hanging | application or HW failure |
| 64 | Network Ping Loss | network card or Gbic issue |
| 65 | LoadAvg rise | CPU check |
| 66 | Fatal failure | PCI card or riser card issue |
| 67 | Hanging or performance down during PXE installation | network card or Gbic issue |
| 68 | Blue screen (0x00004f) | mainboard/BIOS/disk/memory failure |
| 69 | Blue Screen | mainboard/bios/disk failure |
| 70 | OS booting failure | mainboard/bios/disk failure |
| 71 | Panic during process down and OS installation | mainboard/bios/disk failure |
| 72 | Burning smell in server | fan/mainboard/PSU issue |
| 73 | NAS access denied | network/OS setting issue |
| 74 | KVM connection impossible | mainboard/KVM cable/KVM issue |
| 75 | Disk Amber LED | disk failure |
| 76 | Delay during post boot | mainboard/fan/PCI/memory issue |
| 77 | Bad power supply | PSU failure |
| 78 | Teaming performance degradation | network or OS setting issue |
| 79 | VD Bad Block | disk failure |
| 80 | HBA Loop | HBA failure |
| 81 | Raid configuration information not visible | firmware or disk driver issue |
| 82 | Volume recognition impossible | firmware or disk driver issue |
| 83 | Kernel Panic | OS/App issue |
| 84 | Server rebooting when using maximum performance | CPU/PSU/mainboard/memory issue |
| 85 | Significant slowdown of server processing speed | CPU/PSU/mainboard/memory/disk issue |
| 86 | Unable to power on server | PSU failure |

FIG. 21

SERVER MANAGEMENT SYSTEM CAPABLE OF SUPPORTING MULTIPLE VENDORS

CROSS REFERENCES TO RELATED APPLICATIONS

The present application claims priority to Korean Patent Application No. 10-2022-0124122, filed in the Korean Intellectual Property Office on Sep. 29, 2022, the entire contents of which are incorporated herein by reference.

FIELD

The present invention relates to a server management system for managing servers, and more particularly, to a server management system capable of multi-vendor support.

BACKGROUND

Recently, as computers have increased in capacity and speed, computer failures caused by system errors, viruses, and the like have frequently occurred. In particular, in the case of a large-capacity server, failures may occur frequently due to various factors such as operation of various application programs and data storage, reading, and transmission. Therefore, each company assigns a separate server manager who manages the server to manage the server and deal with it when a failure occurs.

By the way, server management requires specialized skills, and hiring such a specialist requires a considerable amount of money. Therefore, especially in small-scale companies or the like, the actual situation is that, instead of hiring a specialized engineer as a server administrator, they select an appropriate person from within the company's existing human resources and place the selected person as a server administrator. In that case, it is difficult to smoothly manage the server, and it is almost impossible to deal smoothly with occurrence of a server failure.

In addition, even when a server manager having specialized skills is employed for server management, if the server manager is located far from the server for reasons such as a business trip, it was difficult to immediately notify the manager of the situation, and it became difficult to deal smoothly with a server failure. Furthermore, even when the server manager is notified of the occurrence of the server failure, it is difficult to deal with it immediately due to the remote location, which can lead to huge losses such as server malfunction.

Conventionally, in an integrated server management system that integratedly manages a large number of servers, when a failure occurs in a server, the failure is detected, and then, the failure is restored later. However, in such a conventional post-failure recovery method, the operation of the server stops during the recovery period of the failed server. Therefore, a significant loss occurs due to interruption of server use, and huge manpower and cost are necessary for recovery.

CITATION LIST

Patent Literatures

Patent Literature 1: Korean Patent Application No. 10-2015-0124642

SUMMARY

In view of the aforementioned problems, it is therefore an object of the invention to provide a server management system capable of supporting multiple vendors and achieving automation more quickly.

The objects of the present invention are not limited to those mentioned above, and those of ordinary skill in the art would clearly understand other objects not mentioned above by carefully reading the following description.

In order to address the aforementioned problems, according to the present invention, there is provided a server management system capable of supporting multiple vendors, comprising: an administrator terminal used by a manager who manages the server management system; a client terminal used by a client who requested a management target server; and a management server that collects data from the management target server and manages status of each management target server to provide various server management information including related management service statistical data and a management service report to the administrator terminal and the client terminal.

The management server may collect and store multi-vendor hardware information from a plurality of the management target servers and provides the stored information to the administrator terminal and the client terminal to allow inquery and use of the stored information.

The management server may collect and store multi-vendor hardware inventory information from a plurality of registered management target servers.

The management server may proceed with a firmware update for all the management target servers if there is a firmware update event including an emergency firmware update.

When a failure issue occurs in any device of the management target servers, the management server may analyze logs and patterns and store the analyzed data. When the failure issue is resolved, the management server may classify the ones similar to the corresponding device, and perform a proactive failure handling process for the classified similar devices.

The management server may collect information on x86 servers in operation, including detailed hardware specifications, OS (Operating system) information, firmware information, and driver information of each management target server using Redfish API, and manage standardization of the x86 servers.

According to the present invention, a server management system capable of supporting multiple vendors is proposed. Therefore, it is possible to manage a plurality of servers more conveniently and efficiently.

In addition, according to the present invention, it is possible to process and deliver data that meets the needs of customers by analyzing failure patterns for customers who own the servers, proactively responding to failures, and providing server management functions.

BRIEF DESCRIPTION OF THE DRAWINGS

The foregoing and additional features and characteristics of this disclosure will become more apparent from the following detailed description considered with reference to the accompanying drawings, wherein:

FIGS. 5, 6, 7, 8, 9, 10, 11, 12, 13, 14, 15, 16, 17 and 18 illustrate screen examples of the server management system according to an embodiment of the present invention;

FIG. 19 is a table for classifying system devices according to an embodiment of the present invention;

FIGS. 20 and 21 are tables for describing hardware symptoms and their causes according to an embodiment of the present invention.

DETAILED DESCRIPTION

Figure 1:
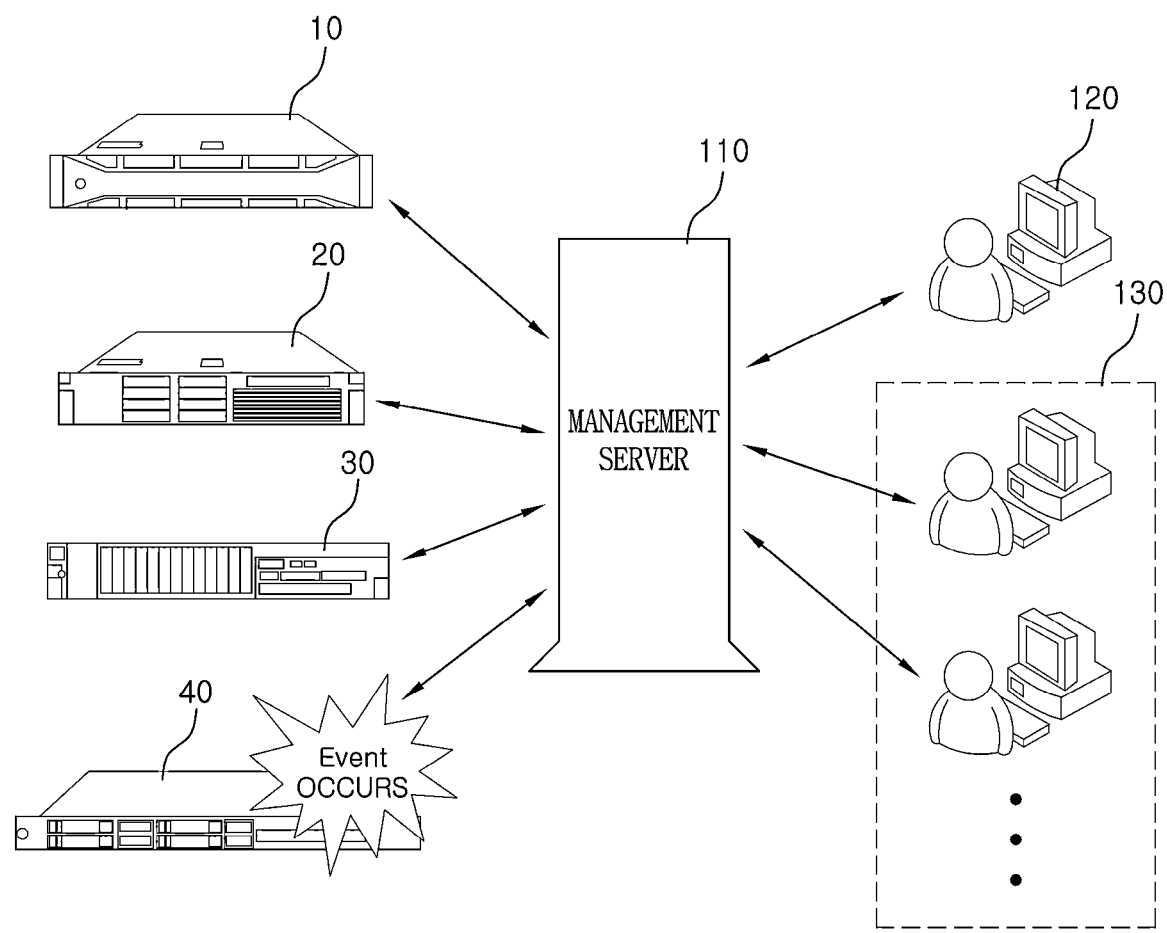
FIG. 1 conceptually illustrates a general configuration of a server management system according to an embodiment of the present invention.

Hereinafter, preferred embodiments of the invention will be described in detail with reference to the accompanying drawings. It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The terminology used herein is only for the purpose of describing particular embodiments and is not intended to limit the invention. As used herein, the singular forms "a," "an," and "the" may be intended to include the plural forms as well, unless the context clearly indicates otherwise. It is further to be noted that, as used herein, the terms "comprises," "comprising," "include," and "including" indicate the presence of stated features, integers, steps, operations, units, and/or components, but do not preclude the presence or addition of one or more other features, integers, steps, operations, units, and/or components, and/or combination thereof.

Unless specified otherwise, all terminologies used herein including technical or scientific terminologies have the same meanings as those generally appreciated by a person ordinarily skill in the art to which the present invention pertains. Terminologies defined in typical dictionaries should be construed to have meanings matching those described in the context of the related art, and should not be construed as being abnormal or excessively formal unless defined apparently herein.

The present invention will now be described with reference to the accompanying drawings, in which like reference numerals denote like elements throughout the entire specification, and they will not be repeatedly described intentionally. In the following description, any specific word or sentence for the related art will not be provided for simplicity purposes if it unnecessarily obscures the subject matter of the invention.

FIG. 1 conceptually illustrates a general configuration of a server management system according to an embodiment of the present invention.

Referring to FIG. 1, the server management system according to the present invention includes a management server 110, an administrator terminal 120, and a customer terminal 130.

The administrator terminal 120 is a terminal used by a manager who manages the server management system.

The client terminal 130 is a terminal used by each client who requested management target servers 10, 20, 30, and 40.

According to an embodiment of the present invention, the administrator terminal 120 and the client terminal 130 can be implemented in the form of various terminals capable of wired and wireless communication, such as a desktop computer, a laptop computer, a tablet PC, a handheld device, a mobile phone, or a smart phone.

The management server 110 collects data from the management target servers 10, 20, 30, and 40, identifies and manages the current status of each management target server, and provides the administrator terminal 120 and the client terminal 130 with various server management information such as management service statistical data and management service reports.

The management server 110 may collect and store multi-vendor hardware information from a plurality of management target servers, and provide the stored information to the administrator terminal 120 and the client terminal 130 so as to inquire and use the stored information.

The management server 110 may collect and store multi-vendor hardware inventory information from a plurality of registered management target servers.

When there is a firmware update event including an emergency firmware update, the management server 110 may perform a firmware update for all management target servers.

When a failure issue occurs in any device of the management target servers, the management server 110 analyzes logs and patterns, and stores the analyzed data. When the failure issue is resolved, the management server 110 may classify devices similar to the corresponding device and perform the proactive failure handling process for the classified similar device.

The management server 110 may collect information regarding the operating x86 server including detailed hardware specifications, OS information, firmware information, and driver information of each management target server using Redfish API, and perform standardization management of the x86 server.

The management server 110 provides a preventive analysis function to prevent similar failures by analyzing failure patterns of the management target servers 10, 20, 30, and 40. When a predetermined event occurs in the management target server 10, 20, 30, or 40 by the preventive analysis function, the management server 110 may transmit, in advance, an expected failure occurrence message warning that a failure may occur in response to the occurred event to the client terminal that requested the management target server.

The management server 110 may provide a history management function for managing installation, failure, and technical support history of the management target servers 10, 20, 30, and 40.

The management server 110 may provide a shipping management function for managing the shipping history of the management target servers 10, 20, 30, and 40.

When a device-related event occurs in the management target server, the management server 110 may classify a dangerous device depending on a predetermined classification criterion, transmit a warning message regarding the dangerous device to the administrator terminal 120 and the corresponding client terminal, and perform the proactive failure handling process for the corresponding dangerous device.

When a device-related event occurs in the management target server, the management server 110 may identify the failure symptom of the corresponding device, analyze the cause depending on the failure code corresponding to the failure symptom, transmit a report including a failure countermeasure to the administrator terminal 120, and perform a failure handling process for the corresponding device.

According to the present invention, the management server 110 may provide a data delivery service function for processing and delivering data regarding management of the management target server in response to a request from the client terminal 130.

In addition, the management server 110 may analyze a critical failure of the management target server, propagate the same case to prevent a server failure in advance, and report failure statistics of each server on a quarterly basis to the administrator terminal 120 and the client terminal 130.

According to the present invention, the management server may manage the history of delivered server-related devices, provide installation/failure/technical support history management services, and manage issues for each part.

The present invention relates to a server management system for managing a plurality of management target servers 10, 20, 30, and 40 requested by clients.

According to an embodiment of the present invention, the management target server, which is a server to be managed, may include various types of servers, such as a Dell server 10, a HP server 20, a Lenovo server 30, and an X86 server 40.

The management target servers 10, 20, 30, and 40 and the management server 110 may communicate on the basis of various types of wired/wireless communication schemes, such as a HTTP communication or JSON-type POST transmission scheme.

In addition, the management target servers 10, 20, 30, and 40 may automatically execute scripts on the basis of a predetermined schedule in various x86 servers of a large-scale computing environment.

The manager accesses the management server 110 by using an administrator terminal 120, executes a batch program on the basis of a schedule determined in the management server 110, and manages a change history of the data by comparing them with existing ones.

The management server 110 automatically collects hardware information and software information of management target servers 10, 20, 30, and 40, identifies the current status of each server on the basis of the collected information, and provides management services depending on the requirements of each server.

The management server 110 may check a BBU (Backup Battery Unit) cycle of the management target server and transmit the check result to the client terminal of the corresponding management target server periodically.

In addition, the management server 110 may check the BBU charging capacity of the management target server and notify the client terminal of the corresponding management target server when the charging efficiency of the battery decreases to a predetermined value or lower. For example, the management server 110 may check the BBU charging capacity of the management target server and notify the client terminal of the corresponding management target server when the charging efficiency of the battery is reduced to 40% or lower.

The management server 110 may check a remaining BBU capacity of the management target server and notify the client terminal of the management target server when the remaining battery capacity is equal to or lower than a predetermined value. For example, the management server 110 may check the remaining BBU capacity of the management target server and notify the client terminal of the corresponding management target server when the remaining battery capacity is 10% or lower.

In addition, the management server 110 may check the BBU write policy for the management target servers and notify the client terminal of the management target server when the write policy is changed.

The present invention proposes an integrated server management system that integratedly manages a plurality of servers, in which various functions of the server are diagnosed, failures are predicted and warned in advance, and solutions are presented together. Herein, a BBU function will be exemplarily described among various functions of the servers.

Taking a Dell server as an example, it is necessary to check the battery status of the BBU and preemptively replace it to prevent loss of cache data caused by a battery failure of the RAID controller. For this purpose, the full charging efficiency (%) of the battery is identified by checking the log of the Dell server, and a device whose full charging efficiency is lower than 50% is identified and replaced. The battery charging efficiency naturally decreases to around 70% after 36 months, and considering this, a battery having an additional decrease of about 20% may be determined to have poor charging efficiency.

The integrated server management system according to the present invention may perform a BBU cycle check, a charging capacity check, a remaining capacity check, and a write policy check, thereby preventing cache data loss and a risk factor for the battery condition in advance.

In the server management system according to the present invention, when an event occurs, it is diagnosed that a server failure may occur from this event, a warning is given to the system of the corresponding server in advance, and information on a solution is delivered together.

In this regard, events occurring in the server are very diverse, and any unprecedented event may newly occur. Now, herein, some possible events in such a server will be exemplified.

1. Fan noise (Reading 12,000 RPM or higher) on Dell R720 server with iDRAC7 version 1.51.51 applied:
   As a countermeasure, it is recommended to downgrade to iDRAC7 1.46.45 version.

2. Power utilization in Racks PDU #1 and PDU #2 is biased toward PDU #1:
   Referring to FIG. 21, the HP server as well as the Dell server is set to operate in "Active Standby" as a default of the power supply, and as a result, power is supplied excessively to any one of the Rack PDUs. For balace, it is necessary to match the ratio of "Primary-PSU".

3. Abnormal OS operation after kernel update of Dell server products 12th to 14th generation:
   In this case, when the management server 110 finds an abnormal operation on the OS (Operating System) after the Kernel update of the Dell server, it transmits an expected failure message to the corresponding management target server, and additionally, a countermeasure for the expected failure is delivered to the corresponding management target server.

4. Service unavailable due to lack of TCP/IP port:
   This is a phenomenon in which the network TIME_WAIT session remains without being closed when the "Uptime" is 497 days or more in Windows 2008. As a result, ports are occupied, and a problem occurs when there is no more port. Targets are Windows 2008 servers and Windows 2012 servers, and the problem can be solved by removing the updated patch.

5. Windows 2003 to 2022 event log occurrence

6. Memory production period diagnosis

This is to confirm whether or not a specific memory of a specific production period is defective. The failure target is 13th generation devices (R730, R930, R630), the failure OS is a Windows2012R2 server with KB3064209 Hotfix, and the countermeasure is to remove the Hotfix.

According to the present invention, the management server 110 diagnoses the memory production period of the management target server, determines a predetermined memory production period as defective, and notifies the management target server.

7. Stop responding in a device setting situation in the case of a PCIe type SSD:

The countermeasure is to update BIOS version 1.1.4 to version 1.2.10.

8. After BIOS update of the 12G server, a temperature sensor does not work normally, and the alert sound continues to occur:

The countermeasure is to diagnose BIOS version 2.5.2 and update the firmware to the latest one.

9. Unable to boot after patch update and BSOD occurrence:

This event is caused by Patch Tuesday Update of Windows error KB2982791 of August 2014.

The failure target is Windows2008 servers, and the failure can be resolved by patch update.

10. DNS connection error in Windows2012 Client using Active Directory:

When logging in with a domain account on the server, an error message "the user name or password is incorrect" occurs even in the case of correct account and password input.

From Windows Server 2008R2 or Windows7, AES256-CTS-HMAC-SHA1-96, AES128-CTS-HMAC-SHA1-96, RC4-HMAC encryption is used only instead of DES-CBC-MD5 and DES-CBC-CRC encryption. This is a phenomenon caused by an issue on the product that AES key generation fails at the time of password update for the computer account when the AD server is Windows Server 2012R2, and the domain member is Windows Server 2008R2 or Windows7.

11. Vulnerability in GNU Bash 4.3 Shell:

It is known that attackers can change web server contents and codes, or make website defacement, leakage of user data, or DDoS attacks by using Bash vulnerabilities. In addition, attack scenarios for Bash code injection vulnerabilities under various environments such as SSH and DHCP protocols are also possible.

The failure target is Red Hat Enterprise Linux 5, 6, or 7 servers, and the countermeasure is Bash update.

12. Buffer overflow vulnerability in the GNU C library (glibc):

This is a phenomenon that a vulnerable function is called in the case of function calls often used in trying to connect to a network, such as gethostbyname( ) or gethostbyname2( ). External attackers can remotely execute arbitrary code on the vulnerable server.

The failure target is Red Hat Enterprise Linux 5, 6, and 7 servers, and the countermeasure is GLIBC update.

13. Bugs in Redhat V5 and V6 family OS:

This bug relates to a reboot phenomenon occuring after 208.5 days in all versions of Red Hat Enterprise Linux 6 and 5 using Intel CPU.

The failure target is Red Hat Enterprise Linux 5 and 6 servers, and the countermeasure is kernel update.

14. Raid controller battery failure:

The I/O performance is degraded due to the unavailability of the Raid Controller Cache. The failure target is the Raid controller battery for Dell Perc 5i, 6i, and the countermeasure is to replace the Raid controller battery for Dell Perc 5i or 6i in advance every 4 to 5 years.

15. System down due to CPU IERR error:

The failure target is servers using the Intel iBridge V2 CPU (PE R720 and PE R920), and the countermeasure is to change the BIOS setting.

For example, System Profile Settings is set to "Custom", CPU Power Management is set to "Maximum Performance", C1E is set to "Disabled C States Disabled", and "Monitor/Mwait" is set to "Disabled".

16. When using iDrac 1.50.50 F/W (Firmware) (corresponding version search), access to the management web is denied:

The counter measure is F/W upgrade on the iDrac F/W OS or upgrade to 1.51.51 through the media in daily life.

The present invention proposes a server management system capable of multi-vendor support. For example, according to the present invention, information on hardware systems of three vendors, such as Dell, H P, and Lenovo, is stored in one inventory. Therefore, all information on hardware can be queried, and functions thereof can be utilized using the information stored in the inventory.

For convenience of description herein, a server management system capable of multi-vendor support will be described by exemplifying manufacturers such as Dell, HP, and Lenovo.

Figure 2:
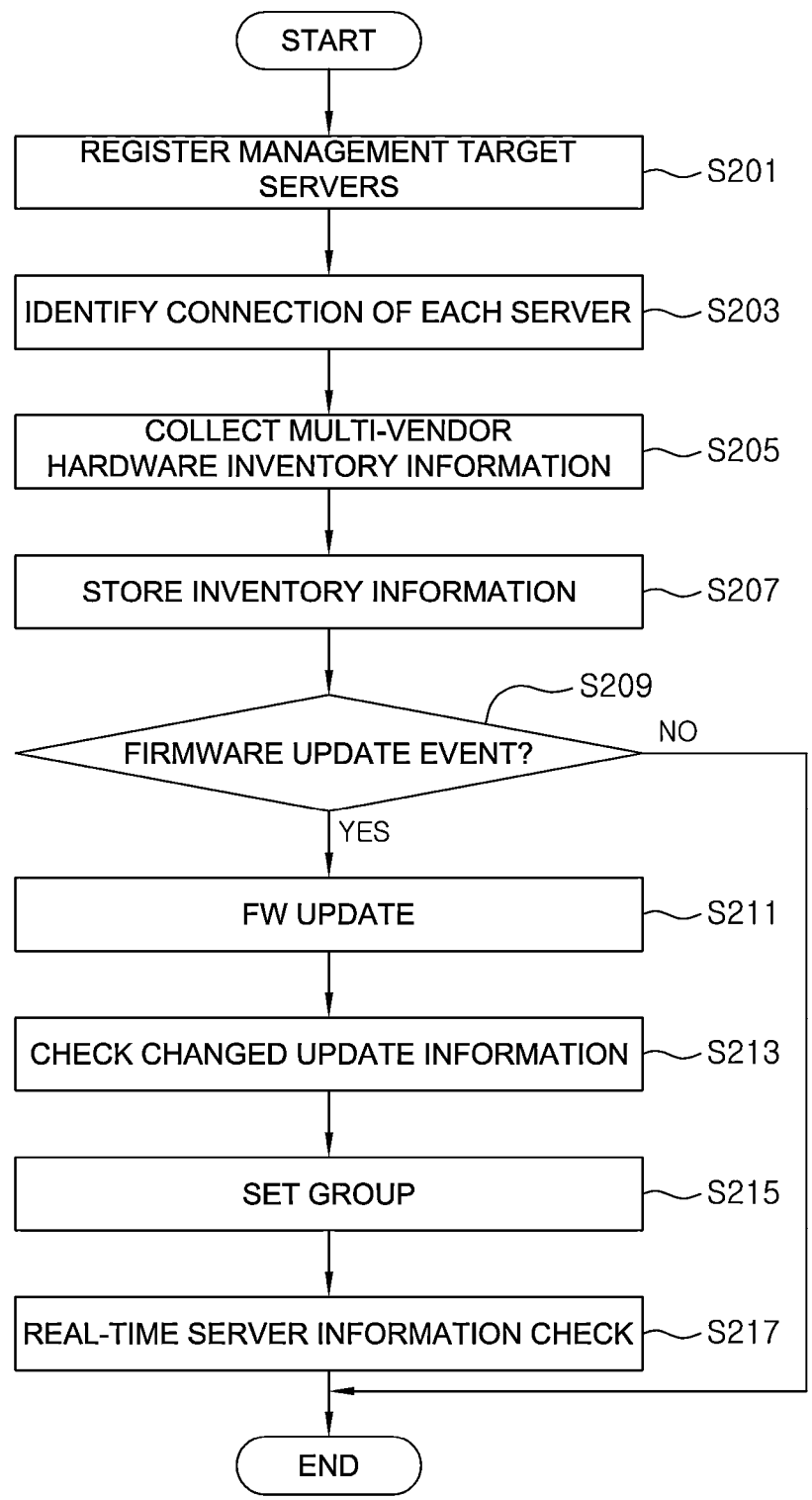
FIG. 2 is a flowchart illustrating a method for managing servers by supporting multiple vendors in the server management system according to an embodiment of the present invention.

FIG. 2 is a flowchart illustrating a method of managing servers by supporting multiple vendors in a server management system according to an embodiment of the present invention. In FIG. 2, the subject of each step is the management server 110.

Referring to FIG. 2, a management target server is registered (S201). In this case, the target server can be registered using the management IP information of each server. For example, the target server can be registered using iDRAC for Dell, iLO for HP, and iMM for Lenovo.

Then, whether each server is connected or not is checked (S203), and multi-vendor hardware inventory information is collected (S205). According to an embodiment of the present invention, inventory information on the hardware system of the x86 server can be collected regardless of manufacturer using Redfish Application Programming Interface (API), which is the common hardware standard.

Then, the collected inventory information is stored (S207).

If there is a firmware update event including an emergency firmware update, the firmware updates are performed on all management target servers (S209). Then, the changed update information is checked (S211). According to an embodiment of the present invention, firmware update information may be checked using Redfish API.

Then, groups are set on the basis of the safety level of each server, whether or not to be inspected, importance, and the like (S215), and the server information is checked in real time (S217).

Figure 3:
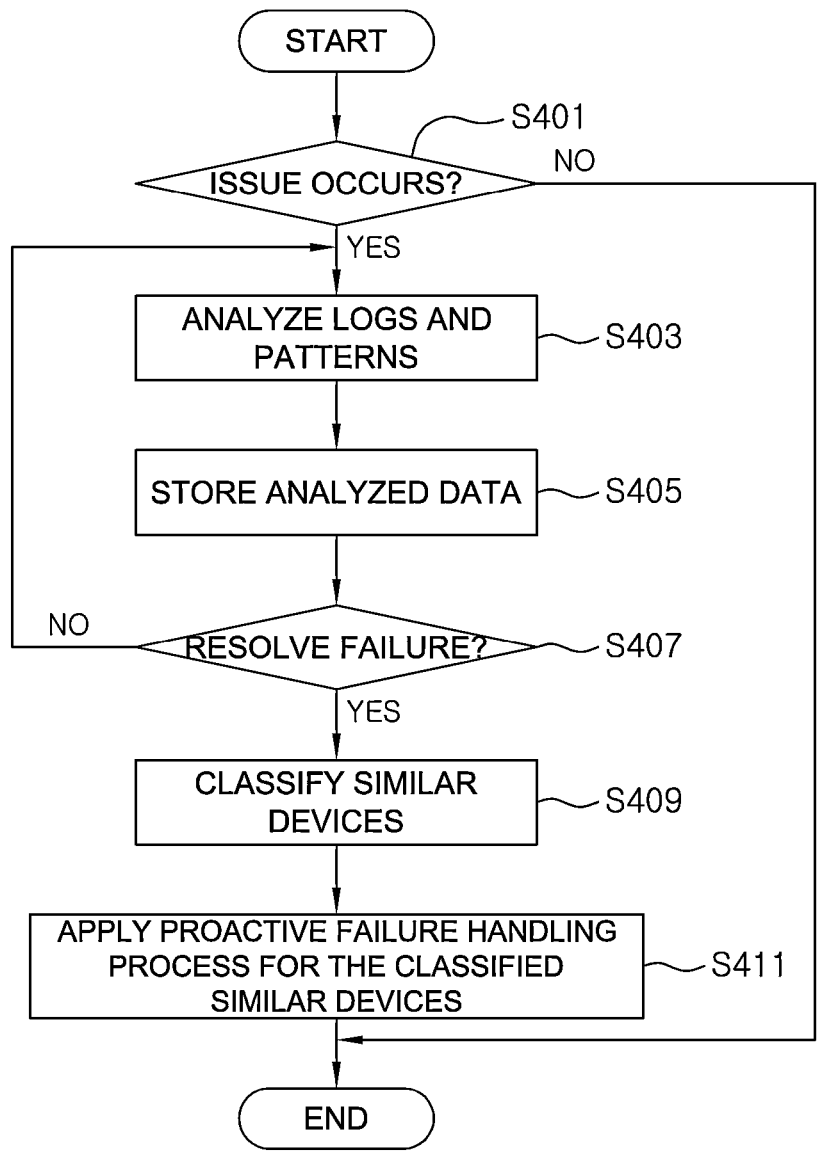
FIG. 3 is a flowchart illustrating a method of proactively preventing a failure by analyzing failure logs and patterns in the server management system according to an embodiment of the present invention.

In this manner, according to an embodiment of the present invention, it is possible to collect various types of information on the x86 servers in operation, such as detailed hardware specifications, OS information, firmware information, and driver information of each server and perform standardization management by using Redfish API FIG. 3 is a flowchart illustrating a method of preventing a failure in advance by analyzing failure logs and patterns in the server management system according to an embodiment of the present invention. In FIG. 3, the subject performing each step is the management server 110.

Referring to FIG. 3, if a failure issue occurs in any device of the management target server (S401), logs and patterns are analyzed (S403). Then, the analyzed data is stored (S405).

If the failure issue is resolved (S407), a device similar to the corresponding device is classified (S409), and a proactive failure handling process is performed for the classified similar devices (S411).

In this manner, according to the present invention, it is possible to prevent failures occurring in similar devices in advance by automatically classifying similar devices by analyzing logs and patterns when a failure issue occurs.

Figure 4:
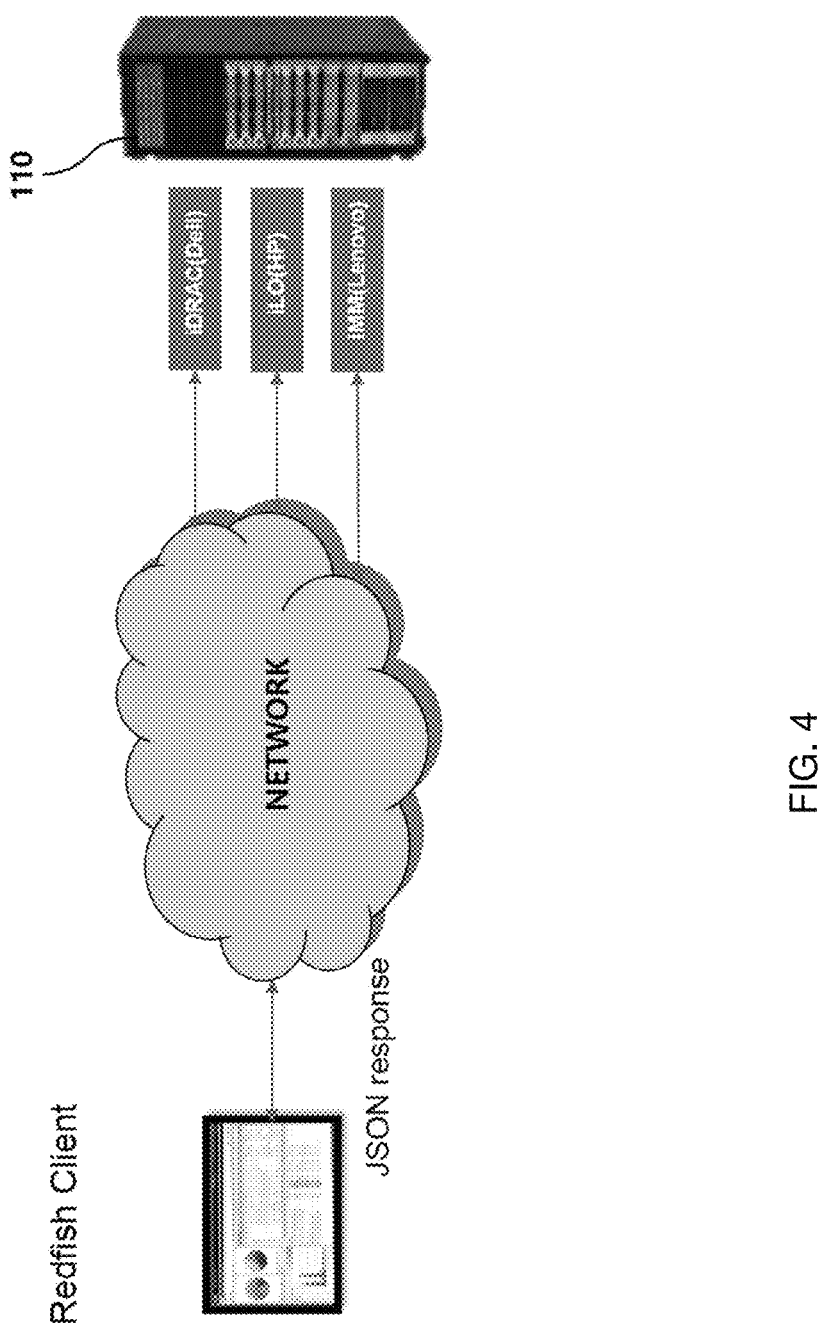
FIG. 4 illustrates an operational model for supporting multiple vendors by utilizing Redfish API in the server management system according to an embodiment of the present invention.

FIG. 4 illustrates an operation model for supporting multiple vendors by utilizing Redfish API in a server management system according to an embodiment of the present invention.

As shown in FIG. 4, according to the present invention, inventory information on the x86 server hardware systems can be collected, and the collected information can be retrieved and utilized using the Redfish AP, regardless of manufacturers such as Dell, HP, and Lenovo. For example, in the case of Dell, data are collected using iDRAC. In the case of HP, data are collected using iLO. In the case of Lenovo, data are collected using iMM. In addition, OS and firmware can be distributed and installed on multiple servers by using Redfish API.

In addition, according to the present invention, it is possible to quickly check hardware specifications, OS information, firmware information, and the like of each server by using Redfish API.

In addition, according to the present invention, it is possible to predict a failure by analyzing patterns, and perform pattern analysis using hardware logs.

Redfish API has been continuously updated since its first release in 2015. It supports many server manufacturing vendors, and provides the same functions as those of IPMI. In addition, Redfish API supports BIOS and Secure Boot setting functions, firmware update functions, and storage and server networking setting functions. In addition, it supports Open Compute Platform, Open stack, SNIA (Storage Networking Industry Association), network switch management, and external storage management, and the like.

The iDRAC, which is a management tool for Power Edge servers, utilizes Redfish to support Redfish RESTful API. For example, the iDRAC can perform server power supply (for reset, reboot, and power control), server hardware inventory, server monitoring and status check, system log collection, server status change check, and alarm.

Power Edge servers can automate initial server settings using Redfish. In addition, it is possible to automate distribution of servers by using various types of configuration information such as iDRAC initial setting, BIOS, RAID controller, and network card as templates.

An example of server configuration automation (Auto Deployment) among Redfish application examples in iDRAC of a Power Edge server is as follows. The unique configuration values of the servers are stored as SCP (Server Configuration Profile) meta-data, which can be configured with the Redfish API. In addition, various setting information such as BIOS, iDRAC/LC, PERC RAID Controller, NIC, and HBA can be set using Redfish API. The SCP can provide Export, Preview, and Import, and configuration information can be freely applied to a newly built server. The SCP can be shared in any forms such as HTTS, NFS, and CIFS and can be implemented in any file format such as XML and JSON.

FIGS. 5 to 18 illustrate screen examples of the server management system according to an embodiment of the present invention.

Figure 5:
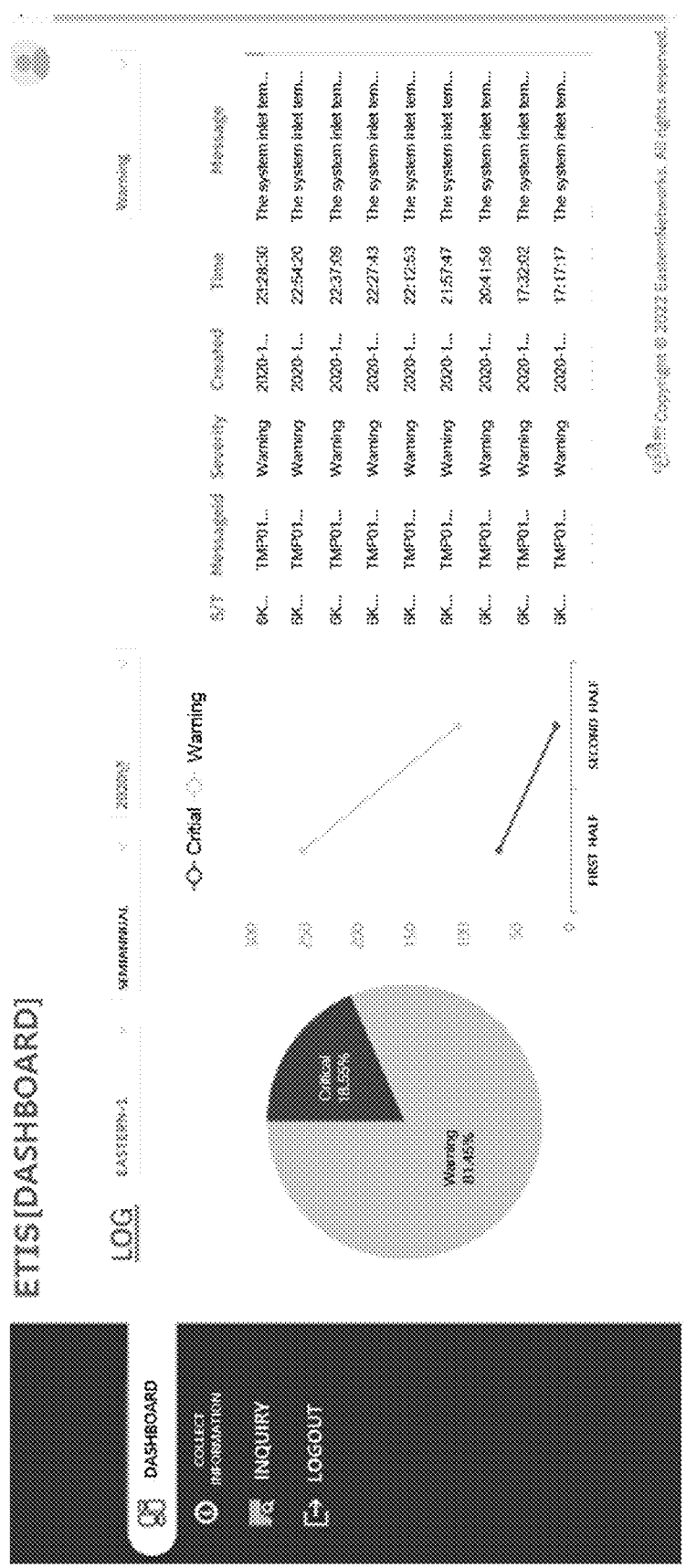

FIG. 5 is an initial screen example supported through a dashboard to allow information on inventory and logs automatically collected for the management target server to be viewed at a glance.

Figure 6:

FIG. 6 is a screen example for checking inventory information of the management target server in real time, in which the inventory information is automatically changed also for the information changed in this screen example.

Figure 7:

In the screen example of FIG. 7, when an issue of the management target server is identified, each part is displayed in red for easy visual recognition, and normal parts are displayed in green.

Figure 8:
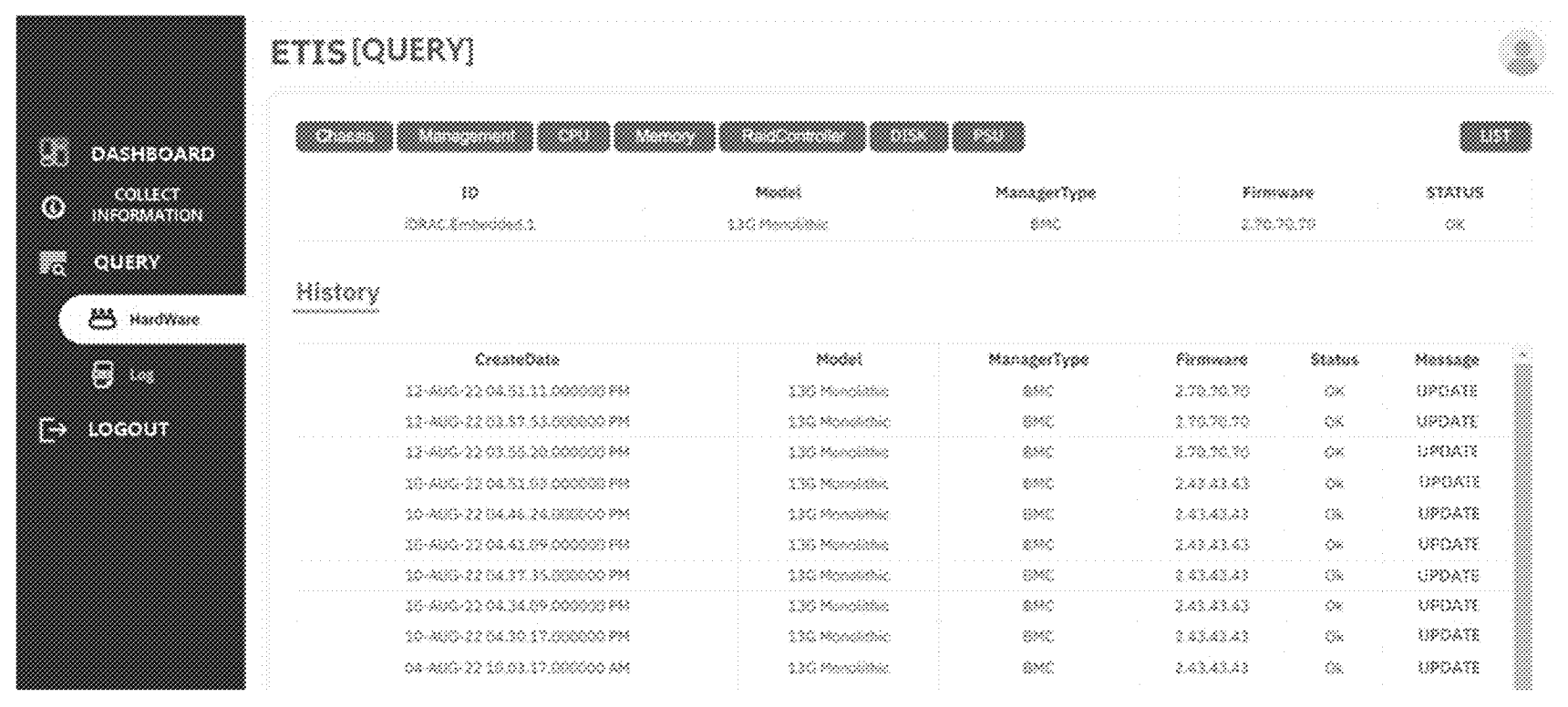

FIG. 8 is a screen example where real-time management information of all the management target servers including firmware (F/W) information can be checked.

Figure 9:
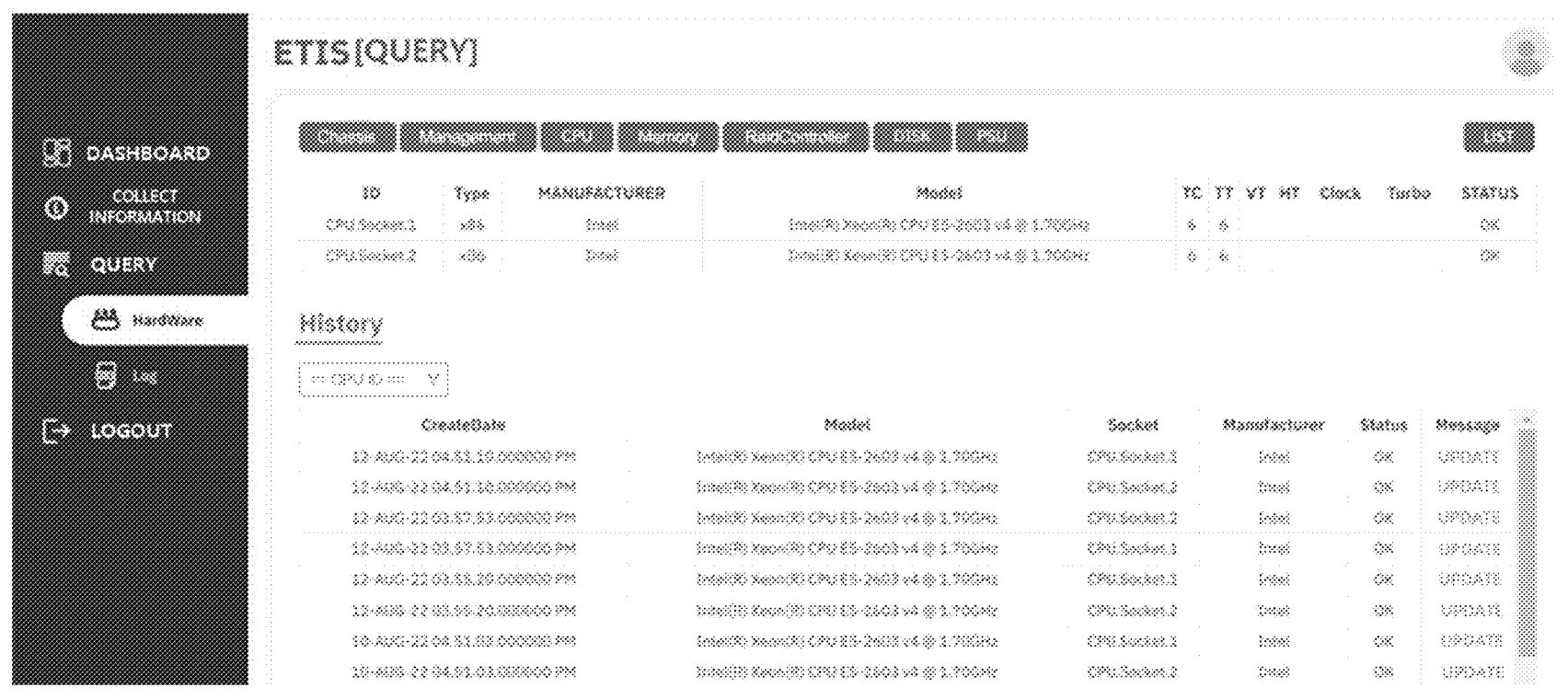

FIG. 9 illustrates a screen example where detailed real-time CPU information and current status of all the management target servers can be checked.

Figure 10:

FIG. 10 is a screen example where detailed real-time memory information and current status of all the management target servers can be checked.

Figure 11:
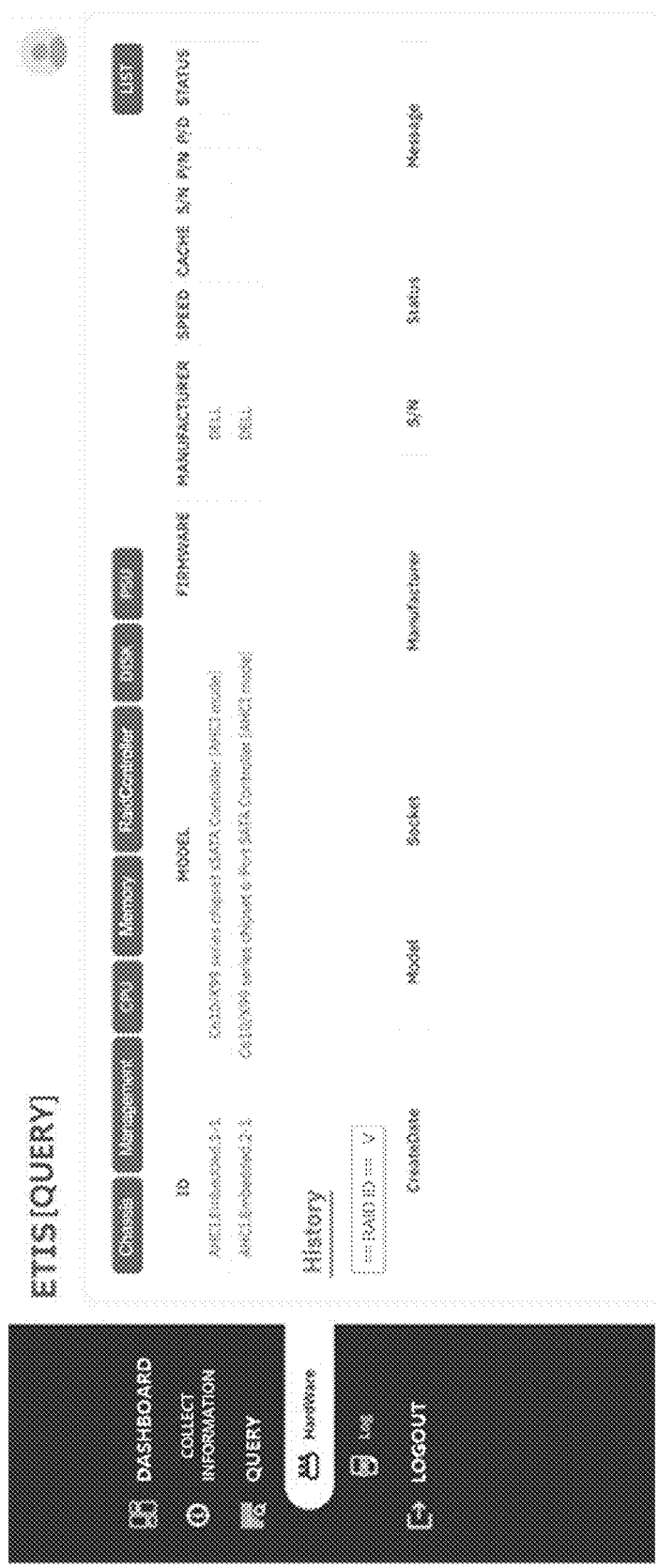

FIG. 11 is a screen example where detailed real-time Raid Controller information and current status of all the management target servers can be checked.

Figure 12:

FIG. 12 is a screen example where detailed real-time disk information and current status of all the management target servers can be checked.

Figure 13:

FIG. 13 is a screen example where detailed real-time information and current status of the power supply units (PSU) of all the management target servers can be checked.

Figure 14:
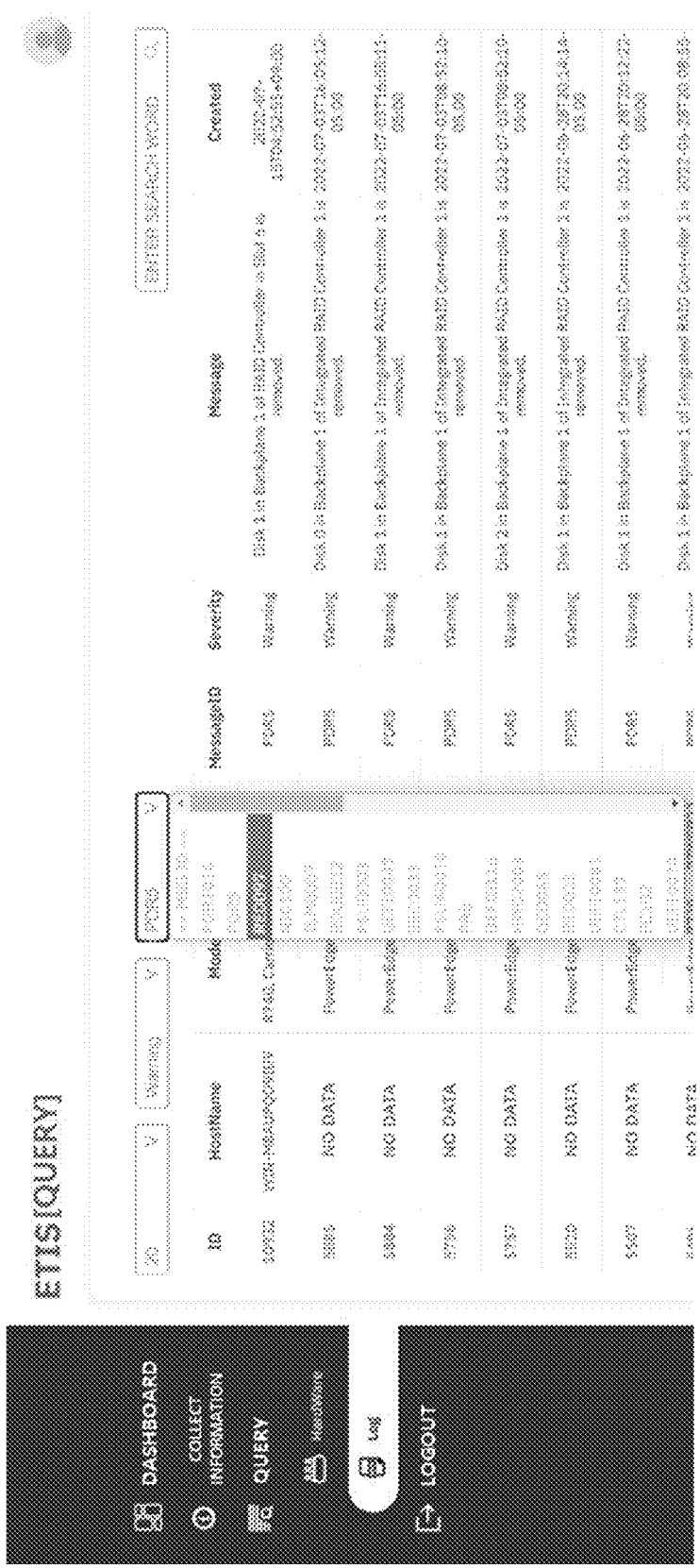
Figure 15:

FIGS. 14 and 15 are screen examples for checking detailed real-time information on the collected logs of all the management target servers, in which real-time vendor HW error codes can be collected and automatically classified to identify issue devices for each error code.

Figure 16:
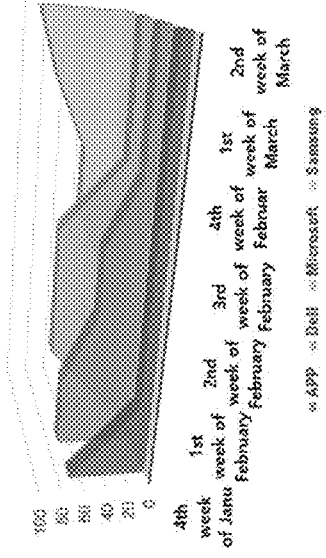

FIG. 16 illustrates an example of a failure analysis screen, in which failure analysis information such as causes of failure, conclusions, and replacement times is displayed.

Figure 17:
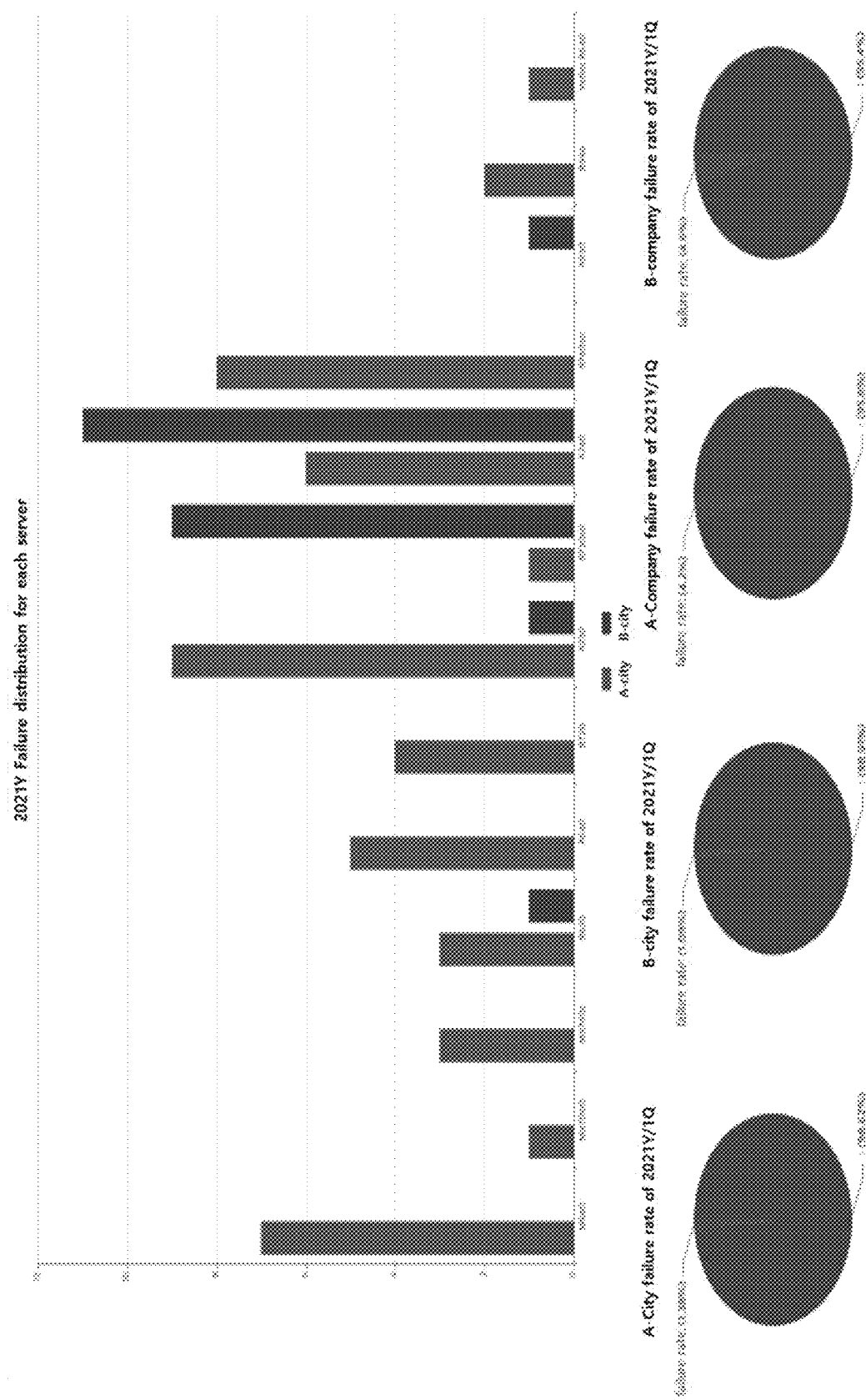

FIG. 17 is a screen example illustrating a failure analysis distribution map for each server compared to a customer company.

Figure 18:

FIG. 18 is a screen example illustrating a service report function, in which contents of the report such as occurrence time, issues, countermeasures, and recurrence prevention measures are exemplified.

FIG. 19 is a table for classifying system devices according to an embodiment of the present invention, and FIGS. 20 and 21 are tables for describing hardware symptoms and their causes according to an embodiment of the present invention.

Figure 22:
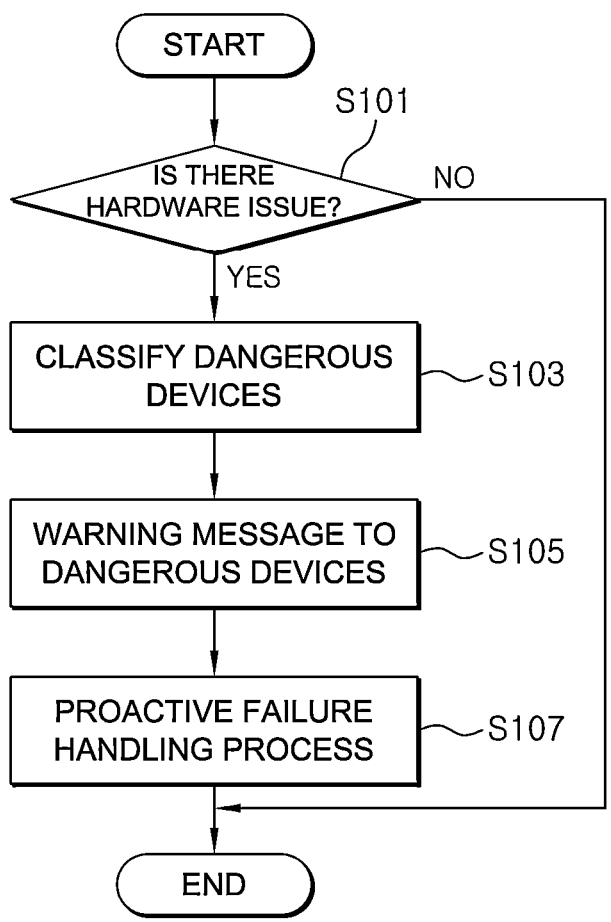
FIGS. 22 and 23 are flow charts illustrating a proactive failure handling method in the server management system according to an embodiment of the present invention.
Figure 23:
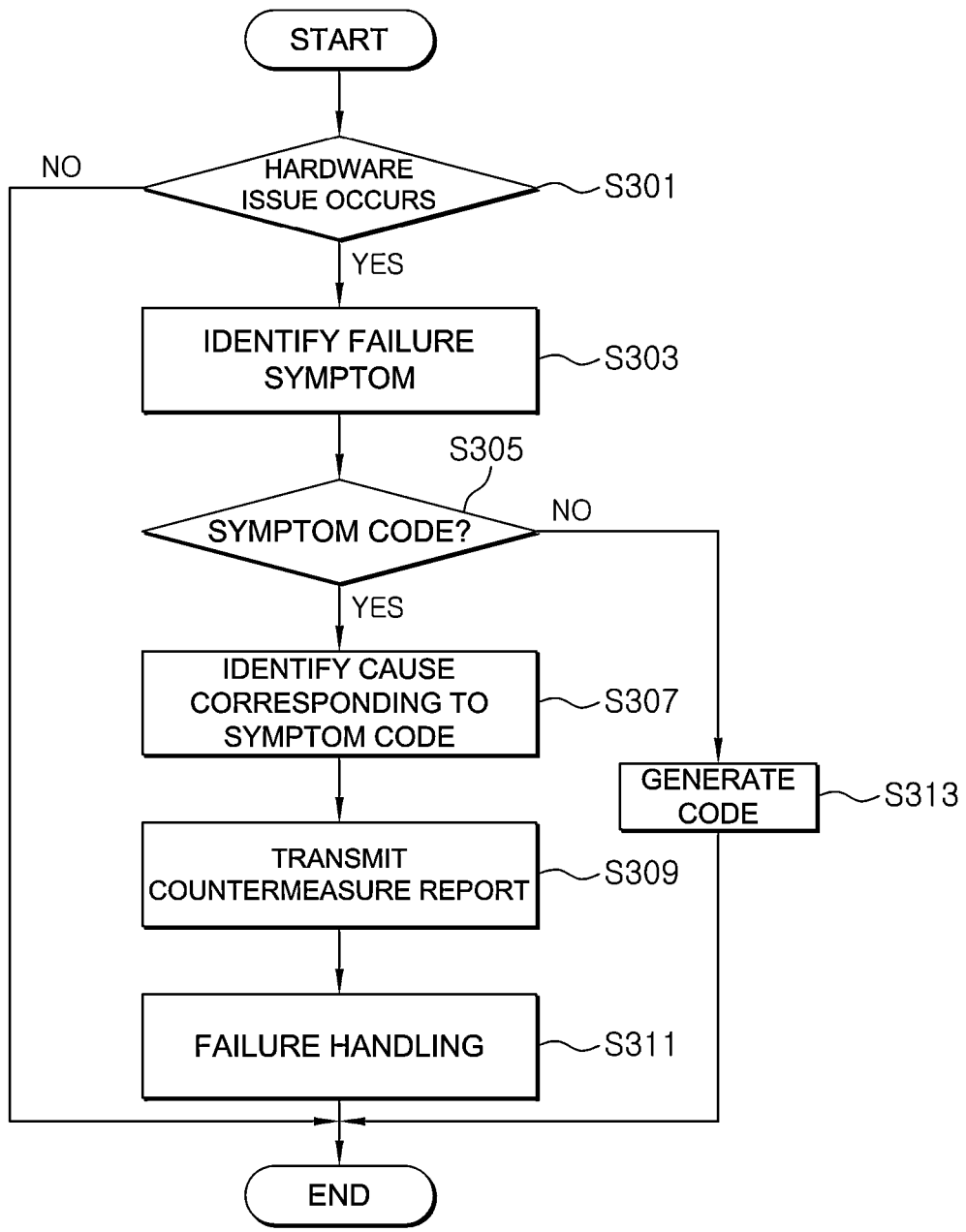

FIGS. 22 and 23 are flow charts illustrating a proactive failure handling method in the server management system according to an embodiment of the present invention.

Referring to FIG. 22, if a hardware-related issue occurs in the management target server (S101), the management server 110 refers to the category table of FIG. 19, and classifies similar devices having a high probability of failure as dangerous devices (S103).

Then, a warning message for the classified dangerous devices is transmitted (S105), and a proactive failure handling process is performed (S107).

Referring to the category table of FIG. 19, specific similarity judgment criteria for the system devices according to an embodiment of the present invention are exemplified. Same chassis classification, same CPU classification, same memory device classification, same NIC device classification, same disk device classification, same HBA device classification, same BIOS device classification, same driver version device classification, same OS device classification, same firmware version device classification, and the like are exemplified.

Referring to FIG. 23, if a hardware-related issue occurs in the management target server (S301), the management server 110 identifies the failure symptom (S303).

Then, a symptom code matching with the failure symptom is identified with reference to the tables of FIGS. 20 and 21 (S305). Then, the cause corresponding to the symptom code is identified (S307), and a countermeasure report is transmitted accordingly (S309). Then, the countermeasure corresponding to the cause of failure is performed (S311).

If there is no symptom code corresponding to the failure symptom in step S305, a new symptom code is generated and added to the list of FIGS. 20 and 21 (S313).

Referring to FIGS. 20 and 21, the causes of failure corresponding to the symptom codes for each failure symptom according to an embodiment of the present invention are listed. Specifically, "RAC1198" is caused by an iDrac Firmware issue, "Correctable memory failure" is caused by a memory issue or a BIOS firmware issue, "Link Failure" is caused by a NIC failure or a Firmware issue, "Repetitive Link Failure Count" is caused by an NIC driver or a firmware issue, "NIC Link is Down" is caused by an NIC driver or firmware issue, "Request to check link state and server" is caused by an NIC driver or firmware issue, "HOST_DOWN" is caused by an NIC driver or firmware issue, "Yellow light" flickering on the server front side is caused by an iDrack firmware issue, "SWC5008:critical message" is caused by an iDrack firmware issue, "NO_PARTITION alarm" is caused by a disk failure, "Reset adapte" is caused by a BIOS firmware issue, "Correctable memory failure" is caused by a memory issue or BIOS firmware issue, "CPU performance down" is caused by a BIOS firmware issue, "No indication for memory and slot" is caused by a memory issue or BIOS firmware issue, "Disk fault failure" is caused by a disk failure, "Disk predicted fail" is caused by a failure by disk bad block, "Periodic FAN6 recognition failure" is caused by a FAN6 failure, "Fault by low light intensity of 400 or lower" is caused by a Gbic failure, "NIC GBIC communication impossible" is caused by a Gbic failure, "Endless system boot" is caused by a BIOS firmware issue, "Specific message on LCD panel" is caused by an iDrac firmware issue, "Repeated error message in iDRAC" is caused by an iDrac firmware issue, "vCenter agent synchronization failure" is caused by an EXSi version or OS version issue, "Server reboot problem" is caused by a BIOS firmware issue, "HBA write speed down" is caused by a HBA firmware or driver issue, "HBA Link Down" is caused by a HBA Gbic or card issue, "HBA duplication switching failure" is caused by a HBA Gbic or card issue, "Riser1 recognition failure" is caused by a Riser card issue, "Riser2 recognition failure" is caused by a Riser card issue, "Network duplication failure" is caused by a network card issue, "PSU Alert—yellow LED light flickering" is caused by a PSU failure, "Abnormality by low voltage" is caused by a PSU failure, "PXE boot impossible" is caused by a BIOS setting or NIC firmware/driver issue, "POST boot impossible" is caused by a mainboard failure, "LifeCycle access denied" is caused by a mainboard failure, "iDRAC Hang" is caused by an iDrac firmware issue, "iDRAC Network disconnection" is caused by a mainboard failure or iDrac firmware issue, "iDRAC SNMP service failure" is caused an iDrac firmware issue, "Abrupt server shutdown" is caused by a mainboard issue, "Medium failure" is caused by a disk failure, "Request to check failure event" is caused by an issue by failure event, and "CMC access denied" is caused by a CMC firmware issue.

In addition, "DSET analysis request" is caused by a failure caused by analysis, "TSR Log analysis request" is caused by a failure caused by analysis, "NFS service start failure" is caused by a NFS setting or OS setting error, "vCenter access denied" is caused by an EXSi version or OS version issue, "NIC Reset" is caused by a network card issue, "GPU recognition failure" is caused by a GPU card failure, "OS crash" is caused by an OS dump analysis, "Network failure/dropped packets" is caused by a network card issue, "CRC error" is caused by a network card issue, "Server-switch disconnection" is caused by a network card issue, "Uneasy communication to network (bonding)" is caused by a network card issue, "Same slot event after replacing memory" is caused by a memory failure or mainboard failure, "Access denied in Disk Read Only state" is caused by a disk failure or RAID configuration issue, "Switch hanging three or four times per month" is caused by a mainboard or OS version issue, "LACP network speed problem" is caused by a network card issue, "Cluster failover" is caused by a cluster setting issue or hardware failure, "RTSP synchronization failure" is caused by an OS setting or network failure, "Session down" is caused by a network card or Gbic issue, "Unknown Power Off" is caused by a PSU failure, "Server slowness and hanging" is caused by an application or HW failure, "Network ping loss" is caused by a network card or Gbic issue, "LoadAvg rise" is caused by a CPU check necessity, "Fatal failure" is caused by a PCI card or riser card issue, "Hanging or performance down during PXE installation" is caused by a network card or Gbic issue, "Blue screen (0x00004f)" is caused by a mainboard/BIOS/disk/memory failure, "OS booting failure" is caused by a mainboard/bios/disk failure, "Panic during process down or OS installation" is caused by a mainboard/BIOS/disk failure, "Burning smell in server" is caused by a fan/mainboard/PSU issue, "NAS access denied" is caused by a network/OS setting issue, "KVM connection impossible" is caused by a mainboard/KVM cable/KVM issue, "Disk amber LED" is caused by a disk failure, "Delay during post boot" is caused by a mainboard/fan/PCI/memory issue, "Bad power supply" is caused by a PSU failure, "Teaming performance degradation" is caused by a network or OS setting issue, "VD bad block" is caused by a disk failure, "HBA loop" is caused by a HBA failure, "Raid configuration information not visible" is caused by a firmware or disk driver issue, "Volume recognition impossible" is caused by a firmware or disk driver issue, "Kernel panic" is caused by an OS/App issue, "Server rebooting when using maximum performance" is caused by a CPU/PSU/mainboard/memory issue, "Significant slowdown of server processing speed" is caused by a CPU/PSU/mainboard/memory/disk issue, and "Unable to power on server" is caused by a PSU failure.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

REFERENCE SIGNS LIST

110: management server
120: administrator terminal
130: client terminal
10, 20, 30, 40: management target server

What is claimed is:

1. A server management system for supporting multiple vendors, comprising:
an administrator terminal;
a client terminal; and
a management server that collects data from a management target server and manages a status of the management target server to provide various server management information including related management service statistical data and a management service report to the administrator terminal and the client terminal,
wherein:
the management server collects and stores multi-vendor hardware information from a plurality of management target servers and provides the stored information to the administrator terminal and the client terminal to allow inquiry and use of the stored information,
the management server checks a backup battery unit (BBU) of the management target server and transmits a check result to the client terminal of the corresponding management target server at a predetermined cycle,
the management server checks a BBU charging capacity of the management target server, identifies a charging efficiency (%) of the BBU, and notifies the client terminal of the corresponding management target server when the charging efficiency (%) of the BBU decreases to a predetermined value or lower,
the management server checks a remaining BBU capacity of the management target server and notifies the client terminal of the management target server when the remaining battery capacity is equal to or lower than a predetermined value,
the management server checks a BBU write policy for the management target servers and notifies the client terminal of the management target server when the BBU write policy is changed,
the management server identifies the charging efficiency (%) of the BBU by checking a log of the management target server, and notifies the client terminal of the corresponding management target server with a message to replace the BBU having the charging efficiency (%) that is lower than the predetermined value,
the management server collects and stores multi-vendor hardware inventory information from each management target server, proceeds with a firmware update for all the management target servers in response to a firmware update event including an emergency firmware update, checks for updated information, sets groups on the basis of a safety level of each server, whether or not to be inspected, and importance, and checks server information in real time,
the management server analyzes logs and patterns in response to a failure issue occurring in any device of the management target servers, stores data from the analyzed logs and patterns, classifies other devices similar to the corresponding device when the failure issue is resolved, and performs a proactive failure handling process for the classified similar devices,
the management server collects information regarding an operating x86 server including detailed hardware specifications, OS information, firmware information, and driver information of each management target server using an API, and performs standardization management of the operating x86 server,
the management server refers to a category table and classifies similar devices having a high probability of failure as dangerous devices in response to a hardware-related issue occurring in the management target server, transmits a warning message to the administrator terminal for the classified dangerous devices, and performs a proactive failure handling process,
the category table includes specific similarity judgment criteria for system devices, and includes same chassis classification, same CPU classification, same memory device classification, same NIC device classification, same disk device classification, same HBA device classification, same BIOS device classification, same driver version device classification, same OS device classification, and same firmware version device classification,
the management server identifies a failure symptom in response to a hardware-related issue occurring in the management target server, identifies a symptom code matching with the failure symptom with reference to a list including causes of failure corresponding to the symptom code matching with the failure symptom, identifies the cause corresponding to the symptom code, transmits a countermeasure report to the administrator terminal, performs a countermeasure corresponding to the cause of failure to address the identified failure symptom, and generates a new symptom code and adds the new symptom code to the list in case of no symptom code corresponding to the failure symptom,
the list describes a plurality of symptom codes that correspond to a plurality of causes of failure, including "RAC1198" that corresponds to an iDrac firmware issue, "Correctable memory failure" that corresponds to a memory issue or a BIOS firmware issue, "Link Failure" that corresponds to a NIC failure or a Firmware issue, "Repetitive Link Failure Count" that corresponds to an NIC driver or a firmware issue, "NIC Link is Down" that corresponds to an NIC driver or firmware issue, "Request to check link state and server" that corresponds to an NIC driver or firmware issue, "HOST_DOWN" that corresponds to an NIC driver or firmware issue, "Yellow light" flickering on the server front side that corresponds to an iDrack firmware issue, "SWC5008:critical message" that corresponds to an iDrack firmware issue, "NO_PARTITION alarm" that corresponds to a disk failure, "Reset adapted" that corresponds to a BIOS firmware issue, "Correctable memory failure" that corresponds to a memory issue or BIOS firmware issue, "CPU performance down" that corresponds to a BIOS firmware issue, "No indication for memory and slot" that corresponds to a memory issue or BIOS firmware issue, "Disk fault failure" that corresponds to a disk failure, "Disk predicted fail" that corresponds to a failure by disk bad block, "Periodic FAN6 recognition failure" that corresponds to a FAN6 failure, "Fault by low light intensity of 400 or lower" that corresponds to a Gbic failure, "NIC GBIC communication impossible" that corresponds to a Gbic failure, "Endless system boot" that corresponds to a BIOS firmware issue, "Specific message on LCD panel" that corresponds to an iDrac firmware issue, "Repeated error message in iDRAC" that corresponds to an iDrac firmware issue, "vCenter agent synchronization failure" that corresponds to an EXSi version or OS version issue, "Server reboot problem" that corresponds to a BIOS firmware issue, "HBA write speed down" that corresponds to a HBA firmware or driver issue, "HBA Link Down" that corresponds to a HBA Gbic or card issue, "HBA duplication switching failure" that corresponds to aHBA Gbic or card issue, "Riser1 recognition failure" that corresponds to a Riser card issue, "Riser2 recognition failure" that corresponds to a Riser card issue, "Network duplication failure" that corresponds to a network card issue, "PSU Alert—yellow LED light flickering" that corresponds to a PSU failure, "Abnormality by low voltage" that corresponds to a PSU failure, "PXE boot impossible" that corresponds to a BIOS setting or NIC firmware/driver issue, "POST boot impossible" that corresponds to a mainboard failure, "LifeCycle access denied" that corresponds to a mainboard failure, "iDRAC Hang" that corresponds to an iDrac firmware issue, "iDRAC Network disconnection" that corresponds to a mainboard failure or iDrac firmware issue, "iDRAC SNMP service failure" that corresponds to an iDrac firmware issue, "Abrupt server shutdown" that corresponds to a mainboard issue, "Medium failure" that corresponds to a disk failure, "Request to check failure event" that corresponds to an issue by failure event, "CMC access denied" that corresponds to a CMC firmware issue, "DSET analysis request" that corresponds to a failure caused by analysis, "TSR Log analysis request" that corresponds to a failure caused by analysis, "NFS service start failure" that corresponds to a NFS setting or OS setting error, "vCenter access denied" that corresponds to an EXSi version or OS version issue, "NIC Reset" that corresponds to a network card issue, "GPU recognition failure" that corresponds to a GPU card failure, "OS crash" that corresponds to an OS dump analysis, "Network failure/dropped packets" that corresponds to a network card issue, "CRC error" that corresponds to a network card issue, "Server-switch disconnection" that corresponds to a network card issue, "Uneasy communication to network (bonding)" that corresponds to a network card issue, "Same slot event after replacing memory" that corresponds to a memory failure or mainboard failure, "Access denied in Disk Read Only state" that corresponds to a disk failure or RAID configuration issue, "Switch hanging three or four times per month" that corresponds to a mainboard or OS version issue, "LACP network speed problem" that corresponds to a network card issue, "Cluster fail-over" that corresponds to a cluster setting issue or hardware failure, "RTSP synchronization failure" that corresponds to an OS setting or network failure, "Session down" that corresponds to a network card or Gbic issue, "Unknown Power Off" that corresponds to a PSU failure, "Server slowness and hanging" that corresponds to an application or HW failure, "Network ping loss" that corresponds to a network card or Gbic issue, "LoadAvg rise" that corresponds to a CPU check necessity, "Fatal failure" that corresponds to a PCI card or riser card issue, "Hanging or performance down during PXE installation" that corresponds to a network card or Gbic issue, "Blue screen (0x00004f)" that corresponds to a mainboard/BIOS/disk/memory failure, "OS booting failure" that corresponds to a mainboard/bios/disk failure, "Panic during process down or OS installation" that corresponds to a mainboard/BIOS/disk failure, "Burning smell in server" that corresponds to a fan/mainboard/PSU issue, "NAS access denied" that corresponds to a network/OS setting issue, "KVM connection impossible" that corresponds to a mainboard/KVM cable/KVM issue, "Disk amber LED" that corresponds to a disk failure, "Delay during post boot" that corresponds to a mainboard/fan/PCI/memory issue, "Bad power supply" that corresponds to a PSU failure, "Teaming performance degradation" that corresponds to a network or OS setting issue, "VD bad block" that corresponds to a disk failure, "HBA loop" that corresponds to a HBA failure, "Raid configuration information not visible" that corresponds to a firmware or disk driver issue, "Volume recognition impossible" that corresponds to a firmware or disk driver issue, "Kernel panic" that corresponds to an OS/App issue, "Server rebooting when using maximum performance" that corresponds to a CPU/PSU/mainboard/memory issue, "Significant slowdown of server processing speed" that corresponds to a CPU/PSU/mainboard/memory/disk issue, and "Unable to power on server" that corresponds to a PSU failure, when an event occurs, the management server diagnoses that a failure may occur in the management target server from the event, warns the management target server to be managed in advance, and delivers information on a solution to the management target server, the management server delivers information recommending downgrading from a first version of a remote access controller to a second different version of the remote access controller when fan noise occurs in the management target server, if service is unavailable due to lack of TCP/IP ports, the management server delivers information to remove updated patches from an operating system for the management target server, and the management server diagnoses the memory production cycle of the management target server, determines that the predetermined memory production cycle is defective, and reports this information to the management target server.

\* \* \* \* \*